US010162726B2

(12) United States Patent
Albrecht et al.

(10) Patent No.: US 10,162,726 B2
(45) Date of Patent: Dec. 25, 2018

(54) MANAGING COMPUTING RESOURCES (75) Inventors: Scott A. Albrecht, Oak Park, IL (US); Joshua Davidson, Chicago, IL (US)

(73) Assignee: Accenture Global Services Limited, Dublin (IE)

(*) Notice: Subject to any disclaimer, the term of this patent is extended or adjusted under 35 U.S.C. 154(b) by 466 days.

(21) Appl. No.: 13/008,178

(22) Filed: Jan. 18, 2011

(65) Prior Publication Data
US 2012/0185462 A1 Jul. 19, 2012

(51) Int. Cl.
*G06F 17/30* (2006.01)
*G06F 11/34* (2006.01)

(52) U.S. Cl.
CPC ...... *G06F 11/3409* (2013.01); *G06F 11/3495* (2013.01); *G06F 2201/80* (2013.01); *G06F 2201/81* (2013.01); *G06F 2201/88* (2013.01)

(58) Field of Classification Search
USPC ........ 707/661, 718, 667, 769; 715/736, 747, 715/751, 780, 781
See application file for complete search history.

(56) References Cited

U.S. PATENT DOCUMENTS

| | | | | |
|---|---|---|---|---|
| 6,092,178 | A * | 7/2000 | Jindal et al. | 712/27 |
| 6,324,580 | B1 * | 11/2001 | Jindal et al. | 709/228 |
| 6,327,622 | B1 * | 12/2001 | Jindal et al. | 709/228 |
| 6,957,211 | B1 | 10/2005 | Tyulenev et al. | |
| 7,325,016 | B1 | 1/2008 | Shee | |
| 7,783,666 | B1 * | 8/2010 | Zhuge et al. | 707/783 |
| 7,908,656 | B1 * | 3/2011 | Mu | G06F 21/6218 726/22 |
| 8,788,528 | B2 * | 7/2014 | Ahlander | G06F 17/30867 707/781 |
| 2001/0027501 | A1 * | 10/2001 | O'Hare et al. | 710/107 |
| 2003/0074520 | A1 * | 4/2003 | Weber | 711/105 |
| 2005/0131994 | A1 * | 6/2005 | Chang et al. | 709/203 |
| 2006/0026141 | A1 * | 2/2006 | Brubacher et al. | 707/3 |
| 2006/0074970 | A1 | 4/2006 | Narayanan et al. | |
| 2006/0271341 | A1 * | 11/2006 | Brown et al. | 703/1 |
| 2006/0277595 | A1 * | 12/2006 | Kinser et al. | 726/3 |
| 2007/0112784 | A1 * | 5/2007 | Blumenau | G06F 17/30082 |
| 2008/0086479 | A1 * | 4/2008 | Fry et al. | 707/10 |
| 2008/0243963 | A1 * | 10/2008 | Havewala | G06F 9/545 |

(Continued)

OTHER PUBLICATIONS

"eG Microsoft SQL Server Monitoring" [online]. eG Innovations, 2010, [retrieved on Oct. 22, 2010]. Retrieved from the Internet: <URL: http://www.eginnovations.com/web/sqlmonitor.htm>.

(Continued)

*Primary Examiner* — Syling Yen
*Assistant Examiner* — Bao G Tran
(74) *Attorney, Agent, or Firm* — Fish & Richardson P.C.

(57) ABSTRACT

Methods, systems, and apparatus, including computer programs encoded on a computer storage medium are disclosed. In one aspect, a method includes filtering a first plurality of requests based on one or more criteria to generate first filtered requests, the first plurality of requests being associated with a first query plan that is associated with a first instance, identifying a first application associated with at least a portion of the first filtered requests, and determining a quantity of cores used by the first application based at least in part on the portion of the first filtered requests associated with the first application.

20 Claims, 6 Drawing Sheets

(56) References Cited

U.S. PATENT DOCUMENTS

| | | | | |
|---|---|---|---|---|
| 2009/0043823 A1* | 2/2009 | Iftode | ............... | G06F 17/3007 |
| 2009/0049443 A1* | 2/2009 | Powers et al. | ............... | 718/100 |
| 2009/0276771 A1* | 11/2009 | Nickolov et al. | ............ | 717/177 |
| 2009/0288094 A1* | 11/2009 | Allen et al. | .................. | 718/104 |
| 2010/0229157 A1* | 9/2010 | Ergan | ................. | G06F 11/0748 |
| | | | | 717/128 |
| 2010/0281102 A1* | 11/2010 | Chinta et al. | ................ | 709/203 |
| 2011/0154327 A1* | 6/2011 | Kozat | .................... | G06F 9/505 |
| | | | | 718/1 |
| 2011/0173618 A1* | 7/2011 | Laborczfalvi et al. | ...... | 718/100 |
| 2011/0246481 A1* | 10/2011 | Narayanan | ........ | G06F 17/30442 |
| | | | | 707/748 |

OTHER PUBLICATIONS

"Application Performance Management for Enterprise Applications" [online]. ManageEngine 2011, [retrieved on Jan. 18, 2011]. Retrieved from the Internet: <URL: http://www.manageengine.com/products/applications_manager/application-performance-managemant-tools.html>.

\* cited by examiner

Exemplary Capacity Planning Report 400

| Matrix Name 402 | App Name 404 | Category 406 | Used Disk (MB) 408 | Usage YTD 410 | Usage June 412 | Usage July 414 |
|---|---|---|---|---|---|---|
| Matrix 1 | Application 1 | Average | 3,236 | 0.08% | N/A | N/A |
| Matrix 1 | Application 2 | Average | 22,400 | 91% | 90% | 92% |
| Matrix 2 | Application 3 | Average | 30,087 | 54% | 54% | 51% |

MANAGING COMPUTING RESOURCES

BACKGROUND

This specification relates to managing computing resources and, in one particular implementation, to managing computing resources across multiple computing instances in a computing matrix.

In general, computing applications must consume various computing resources in order to properly execute, such as clock cycles, memory, and storage. Previous systems have provided techniques for determining an amount of a particular resource used by an application.

SUMMARY

In general, one innovative aspect of the subject matter described in this specification may be embodied in methods for determining a quantity of cores used by a particular application which may be running within multiple instances of a computing matrix, even if those instances are spread across multiple servers. For example, if a user wishes to determine the number of cores used by a first application, the method includes determining the number of cores used by the application in each computing instance. The number of cores used by the application in each instance can be aggregated to provide an aggregate number of cores used by the specified application. Data such as the quantity of cores or the aggregate number of cores used by an application is sometimes referred to as resource utilization data. Actions can be taken based on the resource utilization data. For example, if the number of cores used by the specified application exceeds a predetermined threshold, a notification can be generated, or load balancing can be initiated. A graphical representation of the resource utilization data can be also be provided.

In general, another innovative aspect of the subject matter described in this specification may be embodied in methods for managing computing resources. The method includes filtering a first plurality of requests based on one or more criteria to generate first filtered requests, the first plurality of requests being associated with a first query plan that is associated with a first instance, identifying a first application associated with at least a portion of the first filtered requests, and determining a quantity of cores used by the first application based at least in part on the portion of the first filtered requests associated with the first application.

Other embodiments of these aspects include corresponding systems, apparatus, and computer programs, configured to perform the actions of the methods, encoded on computer storage devices.

These and other embodiments may each optionally include one or more of the following features. For instance, the method includes the action of processing one or more SQL statements to generate the first query plan; filtering includes excluding requests that are not currently executing; filtering includes excluding requests that are associated with system databases or non-application databases; the filtering includes excluding requests based on business rules; identifying the first application includes identifying respective database identifications for the portion of the first filtered requests; identifying the first application further includes identifying respective database names for the portion of the first filtered requests based at least in part on the respective database identifications; identifying the first application further includes identifying the first application based at least in part on the respective database names; the actions include filtering a second plurality of requests based on one or more criteria to generate second filtered requests, the second plurality of requests being associated with a second query plan that is associated with a second instance, identifying a first application associated with at least a portion of the second filtered requests, and determining an aggregate quantity of cores used by the first application based at least in part on the portion of the first filtered requests that are associated with the first application, and the portion of the second filtered requests that are associated with the first application; determining the aggregate quantity of cores includes aggregating the portion of the first filtered requests that are associated with the first application, and the portion of the second filtered requests that are associated with the first application; the first instance and the second instance are associated with a computing matrix; the first instance and the second instance are associated with a single server; the first instance and the second instance are associated with different servers; the actions include providing a graphical representation of the quantity of cores used by the first application; the actions include providing a graphical representation of the aggregate quantity of cores used by the first application; the actions include generating a notification if the quantity of cores or the aggregate quantity of cores exceeds a threshold value; the actions include billing a client associated with the first application based on the quantity of cores or the aggregate quantity of cores used by the first application; and/or billing the client further includes multiplying the quantity of cores or the aggregate quantity of cores by a cost-per-core.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference symbols in the various drawings indicate like elements.

DETAILED DESCRIPTION

Briefly, techniques are disclosed for determining a quantity of cores used by a particular application which may be running within multiple instances of a computing matrix, even if those instances are spread across multiple servers. For example, if a user wishes to determine the number of cores used by a first application, the techniques disclosed herein can be used to determine the number of cores used by the application in each computing instance. The number of cores used by the application in each instance can be aggregated to provide an aggregate number of cores used by the specified application. Data such as the quantity of cores or the aggregate number of cores used by an application is sometimes referred to as resource utilization data. Actions can be taken based on the resource utilization data. For example, if the number of cores used by the specified application exceeds a predetermined threshold, a notification can be generated, or load balancing can be initiated. A graphical representation of the resource utilization data can be also be provided.

Figure 1:
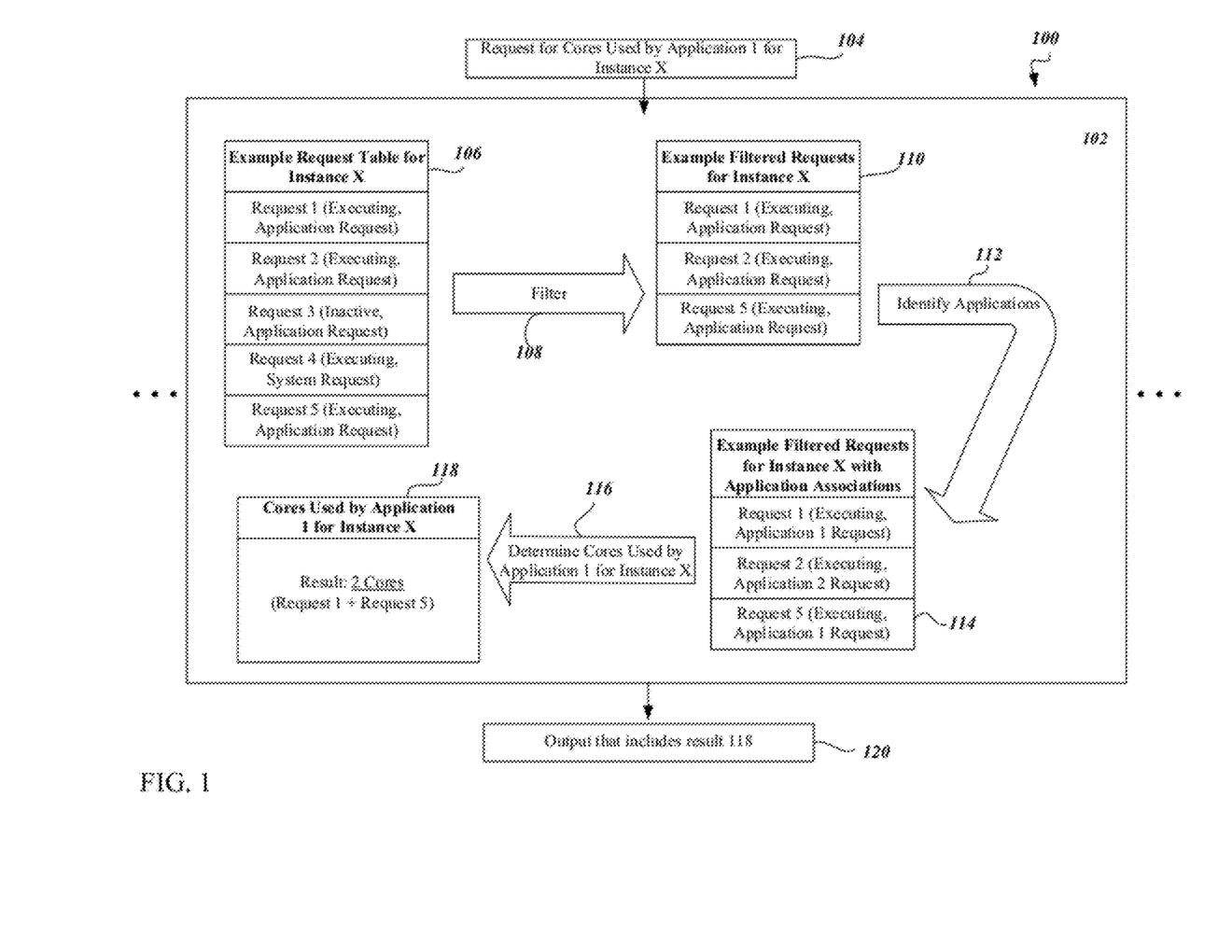
FIG. 1 is a diagram of an exemplary system for managing computing resources.

FIG. 1 shows an exemplary system 100 that includes a resource management engine 102. In some examples, the resource management engine 102 is an entity (e.g., a computing application) that is configured to gather information related to the utilization of one or more computing resources (e.g., processing resources, such as a number of cores or a number of computing cycles used by an application, a database, or a process). The resource management engine 102 may also be configured to process the gathered information in order to analyze one or more aspects of the computing resources being consumed in a computing system. The resource management engine 102 may also take one or more actions in response to analyzing the gathered information. For example, the resource management engine 102 may generate a notification upon the occurrence of a predetermined event.

In some examples the resource management engine 102 receives a request that triggers an analysis of the utilization of computing resources within a computing system. For example, the resource management engine 102 can receive a request 104 for a determination of a number of cores used by a particular application (Application 1 in FIG. 1) running within an instance (Instance X in FIG. 1). After receiving the request 104, the resource management engine 102 may analyze a request table 106 for Instance X to determine the state of one or more requests. In some examples, a request can be a table operation that triggers the following process flow:

[Table Operation]->[Request/Query]->[Identify Database]->[Identify Application]->[Number of cores used for App]

An example of a request is: 'Select * FROM Table1.' In this example, request table 106 includes five requests:
Request 1 (Executing, Application Request)
Request 2 (Executing, Application Request)
Request 3 (Inactive, Application Request)
Request 4 (Executing, System Request)
Request 5 (Executing, Application Request)

In the example of FIG. 1, each request is represented by a row in the request table 106 along with information about the status of each request. For example, Request 1 is accompanied by status information that indicates that Request 1 is Executing (e.g., the request includes instructions that are currently being executing by a processing device) and is an Application Request (e.g., Request 1 is associated with an application that is not a system process such as a process associated with the collection and analysis of resource utilization data). As shown in the request table 106, Request 2 and Request 5 have similar attributes to Request 1, Request 3 is an application request that is not currently executing, and Request 4 is an executing system request.

In some examples, the request table 106 may be associated with a query plan that is generated by processing one or more queries, such as Structured Query Language ("SQL") queries. Processing a single SQL query can result in the generation of a plurality of requests that can then be stored and arranged in the request table 106. An example of the request table 106 is a table called a 'sys.dm_exec_requests' that holds the currently executing requests in the database. A query plan may be a defined set of operations that retrieve data from a database and combine it for a single result set.

In some examples, the request table 106 represents the requests that are currently in a server's queue (e.g., the requests that are currently in a SQL server's queue).

In some examples, the resource management engine 102 can filter the requests in the request table 106 according to one or more criteria. For example, the resource management engine 102 may apply a filter 108 to the requests in the request table 106 in order to identify only those requests that are application requests that are currently executing. Applying the filter 108 to the request table 106 results in the generation of a group of filtered requests 110 for Instance X. For example, if the filter 108 is configured to exclude requests that are not currently executing (e.g., inactive Request 3) and requests that are associated with system processes (e.g., system Request 4), the filtering process would result in the generation of a group of filtered requests 110 that includes only Request 1, Request 2, and Request 5. While we sometimes describe applying the filter 108 as resulting in the "generation of" the filtered requests 110, applying the filter 108 may also result in the identification of the filtered requests 110; that is, the resource management engine 102 may not necessarily generate any new data structures as a result of the filtering process. In other examples, the resource management engine 102 may generate a new data structure that includes the requests that satisfy the criteria of the filter 108.

After generating the group of filtered requests 110, the resource management engine 102 identifies applications that are associated with the filtered requests 110 (112). While in some examples the applications associated with the filtered requests may be readily identifiable, in some situations the resource management engine 102 may perform a number of operations in order to identify the application associations. For example, in order to identify the application associated with Request 1, the resource management engine 102 may use information associated with Request 1 to identify a database identification associated with Request 1. The resource management engine 102 can use the database identification to identify a database name associated with Request 1. The database name may include an identifier that can be looked up in a repository of application information in order to ultimately identify an application name associated with Request 1. Stated differently, the resource management engine 102 can use a database identifier associated with a filtered request 108 to identify a database name. Because the database name includes an identifier that can be cross-referenced in a repository of application names, the resource management engine 102 may ultimately identify a specific application associated with a filtered request 108 by cross referencing information between a series of databases.

Identifying the application associations (112) results in an associated group 114 of filtered requests that are linked to their respective applications. For example, Request 1 and Request 5 are associated with Application 1, while Request 2 is associated with Application 2. The resource management engine 102 may then use the information in the associated group 114 in order to determine the number of cores being used by a particular application. For example, the resource management engine 102 can determine 116 the number of cores being used by Application 1 in Instance X. In some examples, the resource management engine 102 can perform the determination 116 by counting the number of requests associated with the application specified in the request 104. In the example of FIG. 1, the resource management engine 102 determines that Application 1 is using two cores for Instance X, as both Request 1 and Request 5 are associated with Application 1. Thus, for Instance X, two clock cycles (and thus two cores) are used in order to process Request 1 and Request 5, both of which are attributable to Application 1.

The resource management engine 102 generates a result 118 based on the determination 116. The resource management engine 102 may then pass an output 120 that includes the result 118 in a format that satisfies the request 104. The output 120 may be passed to the entity which transmitted the request 104 or may be passed to one or more other computing entities.

In some examples, the request 104 may be a component of a larger request that requests the number of cores being used by an application (e.g., Application 1) across multiple instances, or even across an entire computing matrix. For example, requests that are similar to the request 104 can be passed to the resource management engine 102 (or other resource management engines). The additional requests may be directed to the amount of resources used by an application in instances other than Instance X (e.g., instance Y and instance Z). The resource management engine 102 can perform similar operations to those described above in order to determine the amount of resources (e.g., the number of cores) being utilized by an application across multiple instances, even if those multiple instances span an entire computing matrix implemented on a plurality of servers. After obtaining an output 120 for each instance, the resource management engine 102 can aggregate the results 118 included in the outputs 120 in order to provide the aggregate resources utilized by an application. For example, if Application 1 consumed 2 cores in Instance X, 3 cores in Instance Y, and 1 core in Instance Z, the resource management engine 102 could determine that Application 1 consumes a total of 6 cores across a computing matrix that includes Instances X, Y, and Z. The same holds true even if Instances X and Y are implemented on a different server than Instance Z.

Figure 2:
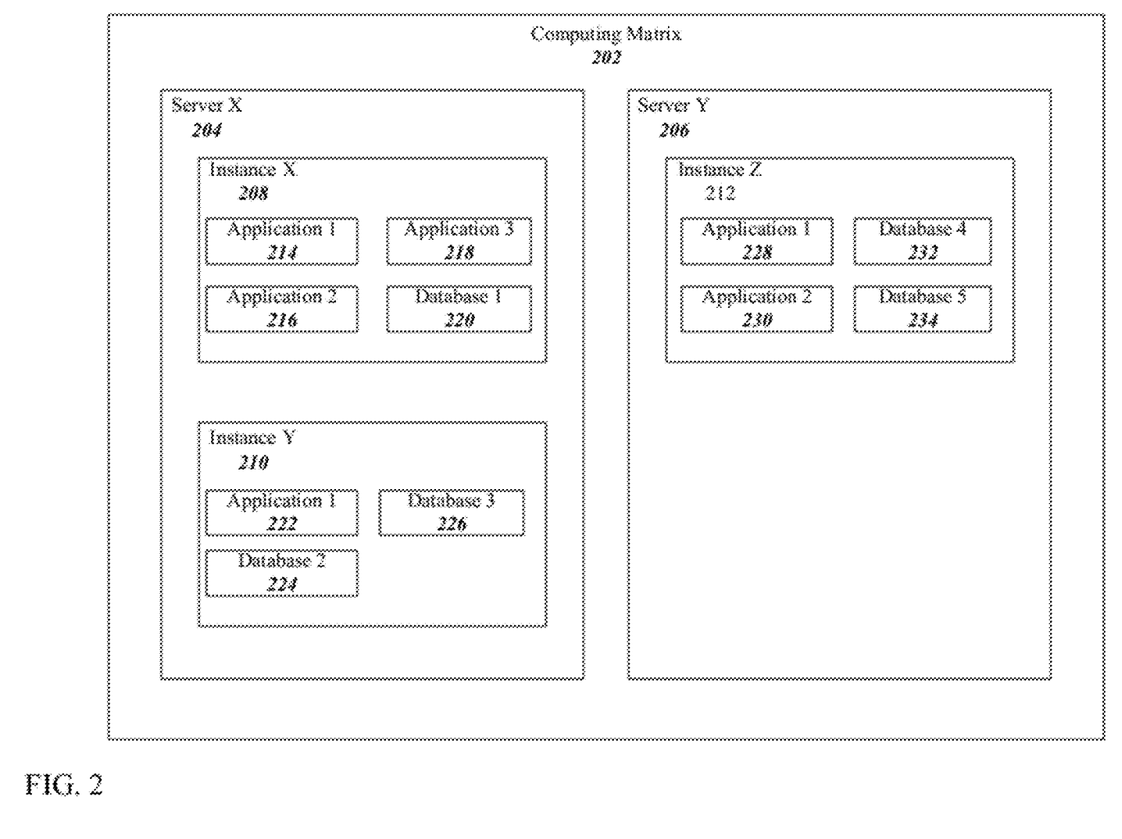
FIG. 2 is a diagram of an exemplary computing system.

FIG. 2 shows an exemplary computing matrix 202. The computing matrix 202 includes two servers, Server X 204 and Server Y 206. While the computing matrix 202 includes only two servers in the example of FIG. 3, the computing matrices can include any number of servers. The servers within a matrix may be arranged in a "cloud" configuration where a given server may communicate with any of the other servers, while in some examples, the servers communicate through a centralized computing entity. Server X and Server Y may be separate physical machines, or may be implemented as two different software modules running on the same machine.

Server X and Server Y host multiple computing instances. For example, Server X 204 hosts Instance X 208 and Instance Y 210, while Server Y hosts only Instance Z 212. In general, a computing instance represents a distinct processing environment that can include multiple applications and databases. For example, Instance X includes Application 1 214, Application 2 216, Application 3 218, and Database 1 220, Instance Y includes Application 1 222, Database 2 224, and Database 3 226, and Instance Z includes Application 1 228, Application 2 230, Database 4 232, and Database 5 234. Applications (e.g., Application 1 214) may communicate with databases (e.g., Database 1 220) and/or other applications (e.g., Application 2 216) within their respective instances, or may communicate with databases and/or applications that are implemented in other instances.

In some examples, the resource management engine 102 can be implemented as a system application that is able to communicate with all applications and databases within the computing matrix 202. However, the resource management engine 102 could also be implemented as an application that runs within one or more instances, and could communicate with other instances and servers via one or more centralized computing entities. Regardless, the resource management engine 102 may be configured to access and process resource utilization information from multiple sources, even if those sources as spread across multiple instances and servers.

As a brief example, the resource management engine 102 may receive a request, as above, to calculate the number of cores being used by Application 1. As before, the resource management engine 102 could begin to produce a result by processing requests that are associated with Application 1 214. However, because there are other occurrences of Application 1 running in other instances (e.g., Application 1 222 in Instance Y and Application 1 228 in Instance Z), the resource management engine may also have to perform similar operations to determine the number of cores being used by each occurrence of Application 1 and then aggregate the results. For example, if Application 1 214 uses 1 core, Application 1 222 uses 2 cores, and Application 1 228 uses 3 cores, the resource management engine 102 may determine that Application 1 uses 6 total cores in the computing matrix 202.

Figure 3:
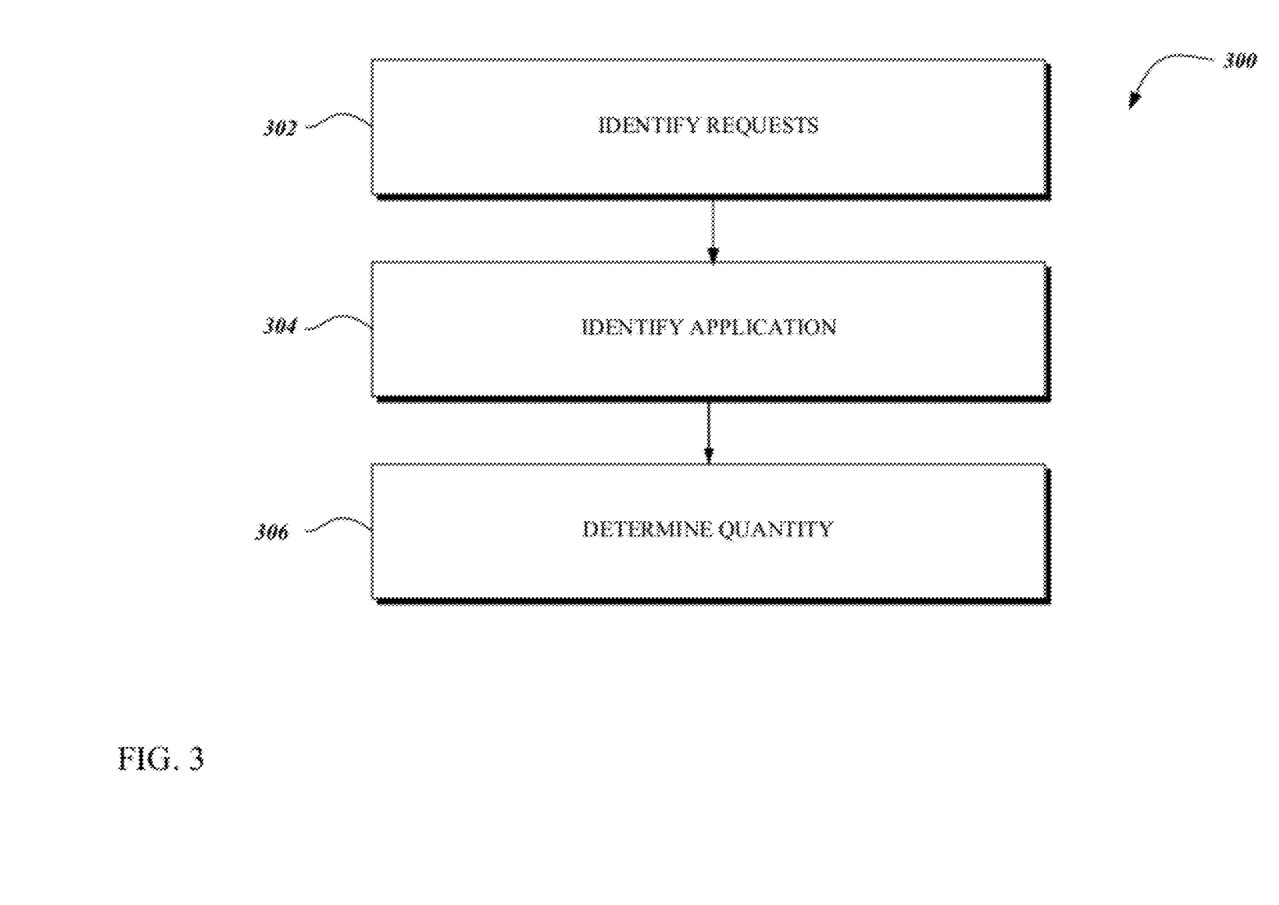
FIG. 3 is a flow chart of an exemplary process for managing computing resources.

FIG. 3 shows an exemplary process 300 for determining a quantity of cores used by an application. A first plurality of requests is filtered based on one or more criteria to generate first filtered requests (302). The filtering process can be initiated upon the receipt of a request (e.g., from user input or from a computing entity as part of a scheduled process). For example, the resource management engine 102 may access requests that are associated with a query plan for a first instance before filtering those requests to provide filtered requests. In some examples, query plans are generated using information in one or more statements, such as SQL statements. The resource management engine 102 filters requests according to predetermined criteria. For example, the criteria may specify that only requests that are currently executing or requests that are not system requests satisfy the criteria. The criteria can also represent business rules. For example, the criteria may specify that only data collected during normal business hours will be processed, that only data from a particular class of users will be processed, that data collected on week days will be processed, or other such rules. The criteria can be specified and/or altered by user input (e.g., through one or more command line entries or entries specified in a graphical user interface such as a web-based user interface). The resource management engine 102 can also retrieve the criteria as one or more pre-generated files that contain the criteria. After filtering the requests, the resource management engine 102 identifies those requests that satisfied the criteria. The resource management engine 102 can create one or more new files to group the filtered requests, or may provide a location of each filtered request that satisfied the criteria to another process or application for further processing.

A first application associated with at least a portion of the first filtered requests is identified (304). For example, the resource management engine 102 identifies an application that is associated with one or more of the filtered requests. In some examples, the first application is specified in the request for core resource analysis (e.g., a user submits a request for the number of cores used by a particular application).

While in some examples the resource management engine 102 may easily identify the application associated with each request, the resource management engine 102 may occasionally perform further operations to identify the application associated with one or more of the requests. For example, in order to identify the application associated with a request, the resource management engine 102 may use information associated with the request to identify a database identification associated with the request. The resource management engine 102 can use the database identification to identify a database name associated with the request. The database name may include an identifier that can be looked up in a repository of application information in order to ultimately identify an application name associated with the request. Stated differently, the resource management engine 102 can use a database identifier associated with a filtered request to identify a database name. Because the database name includes an identifier that can be cross-referenced in a repository of application names, the resource management engine 102 may ultimately identify a specific application associated with a filtered request by cross referencing information between a series of databases.

A quantity of cores used by the first application is determined based at least in part on the portion of the first filtered requests associated with the first application (306). In some examples, after the filtered requests have been identified that are associated with the specified application (e.g., the "first application"), the resource management engine 102 may calculate the quantity of cores used by that application. In some examples, each filtered request associated with the specified application may represent one core of use (e.g., one clock cycle).

The determination of the quantity of cores used by an application can be repeated for multiple instances running on multiple servers within a computing matrix. That is, if a request is received that requests the number of cores being used by an application that is running on 4 instances spread across 3 servers, the resource management engine 102 can determine the number of cores being used by that application across the entire computing matrix (e.g., in all 4 instances). In some examples, the determination can be repeated multiple times to produce time-aggregated data. For example, repeating the determination at regularly scheduled intervals over a given time period can provide data that represents resource utilization for that time period. The resource utilization information can also be further manipulated to provide information that is even more useful to a user. For example, each core or clock cycle can be associated with a business unit, such as a dollar amount, so that a monetary cost for each application can be determined from the resource utilization data. For example, if each core is equated to $0.10 and an application is determined to be using 6 cores, the application can be said to have a cost of $0.60.

Figure 4:
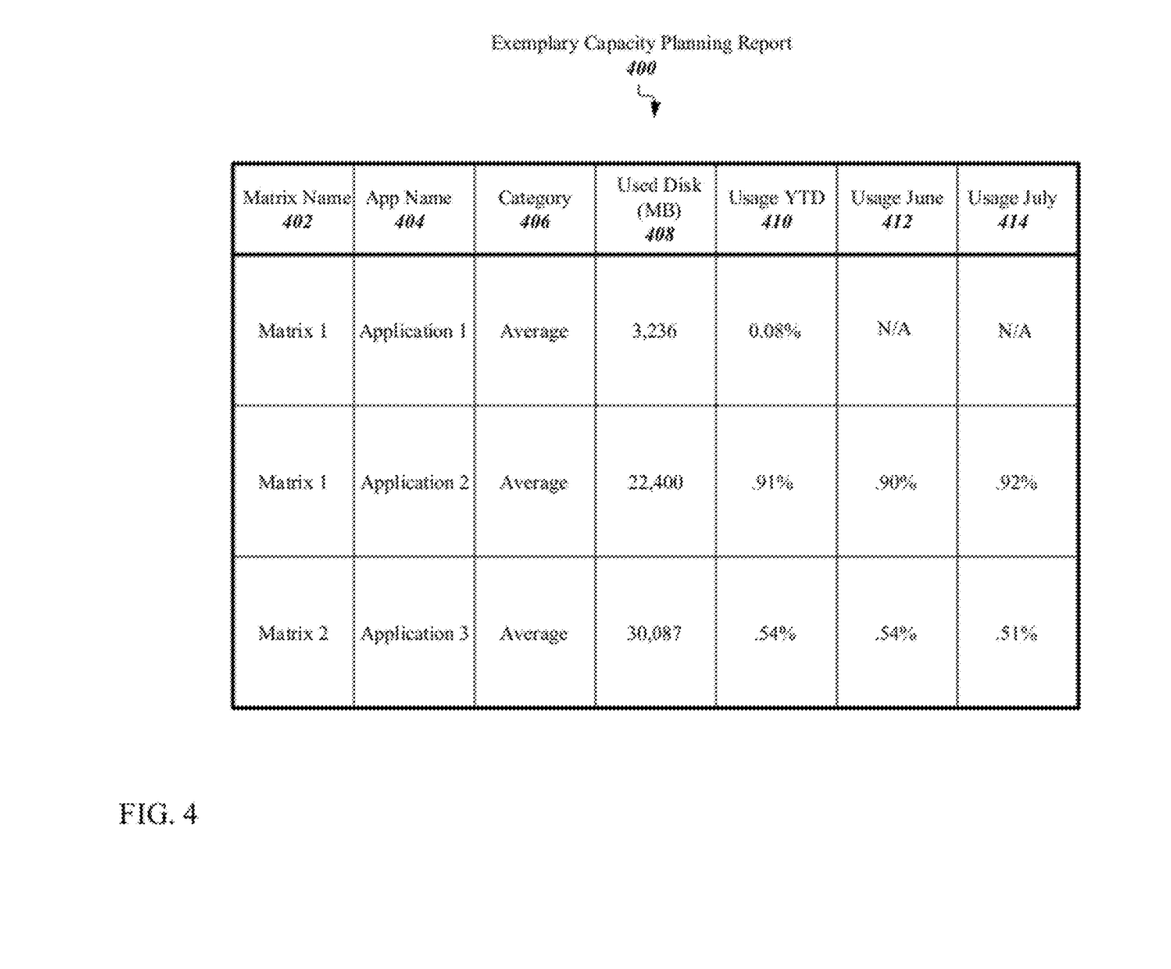
FIGS. 4 and 5 are diagrams of exemplary organizations of information that relates to the management of computing resources.

FIG. 4 shows a report 400 that illustrates resource usage by a number of different applications within several computing matrices. An application, such as the resource management engine 102, can generate the report 400 using the resource utilization data collected and generated using the techniques described above. The report 400 includes columns that represent a matrix name 402, an application name 404, a "category" 406, a used disk space 408, a year-to-date usage 410, and usages for the months of June 412 and July 414. Using the second non-heading row 416 of the report 400, Application 2 in Matrix 1 is using an "average" number of cores. The categories 406 can represent user-defined categories for resource usage. For example, if an application is using less than a pre-defined number or percentage of cores, that application can be given a label (e.g., "average") commensurate with that usage.

The year-to-date usage 410 and the June 412 and July 414 usages can be expressed in terms of an average percentage of cores used by the application. For example, Application 2 has a year-to-date usage of 0.92%, which may mean that Application 2 is using on average 0.92% of a Center Processing Unit (CPU) core for a given year. In this example, the yearly and monthly data appear similar because the data collection period is relatively short.

Figure 5:
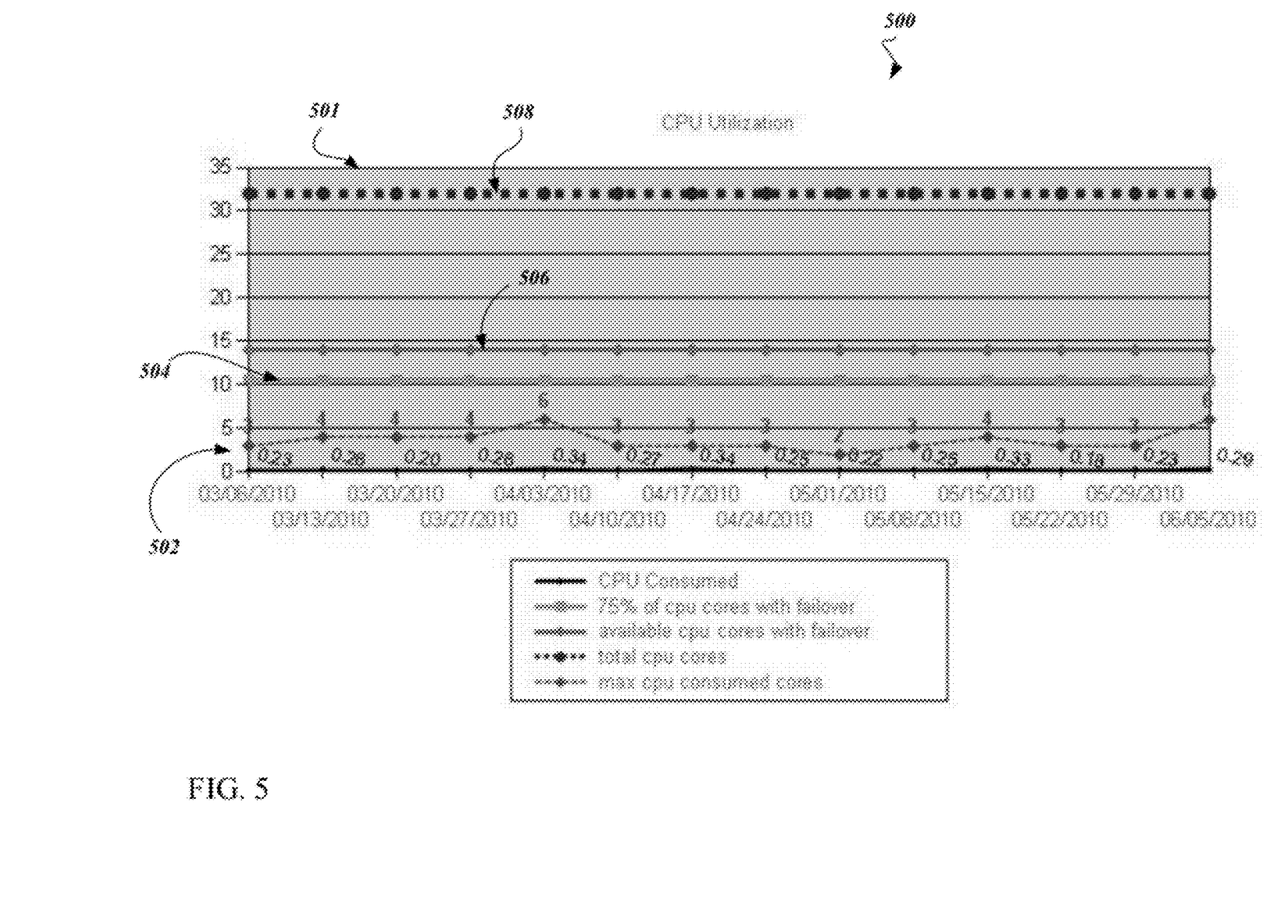

FIG. 5 shows an exemplary user interface 500 that can graphically present information about resource management to a user (e.g., on a graphical display associated with the resource management engine 102). The user interface 500 includes a graph 501 that plots information about utilized cores over time. For example, the graph 501 can present information about the number of cores actually used in a computing system (e.g., by a specific application), which can be represented by line 502. The line 502 may represent the number of cores used at a specific time, or may represent an average number of cores used over a predefined time period.

The graph 501 may also include elements to emphasize other information related to resource utilization in a computing system. In the example of FIG. 5, the graph 501 includes line 504, which represents a first threshold percentage of cores. As described above, the threshold represented by line 504 can be configured by an administrator to reflect a point at which, when exceeded by the number of consumed cores (e.g., line 502), one or more additional actions can be taken. For example, if the number of consumed cores exceeds the threshold represented by line 504, a notification can be generated that alerts a system administrator. In this example, line 504 represents a threshold where 75% of cores are used with failover taken into account. In some examples, a failover rule may specify that some number of servers (e.g., two servers) can be lost without any preventing the proper execution of applications within the same matrix. The graph 501 can also include further information, such as a line 506 that represents a number of available cores with failover. The graph 501 may also include line 508, which represents the total number of cores in the computing system (e.g., without accounting for failover rules).

In general, system administrators may use the user interface 500 (including graphs such as the graph 501) in order to ascertain key characteristics of the resource utilization of a computing system. The user interface 500 may also include controls to adjust parameters of a resource management utility. For example, the user interface 500 may include controls to adjust the level of a threshold for notification. The user interface may also include controls for performing load balancing among servers, instances, processors, and other computing platforms and resources.

Figure 6:
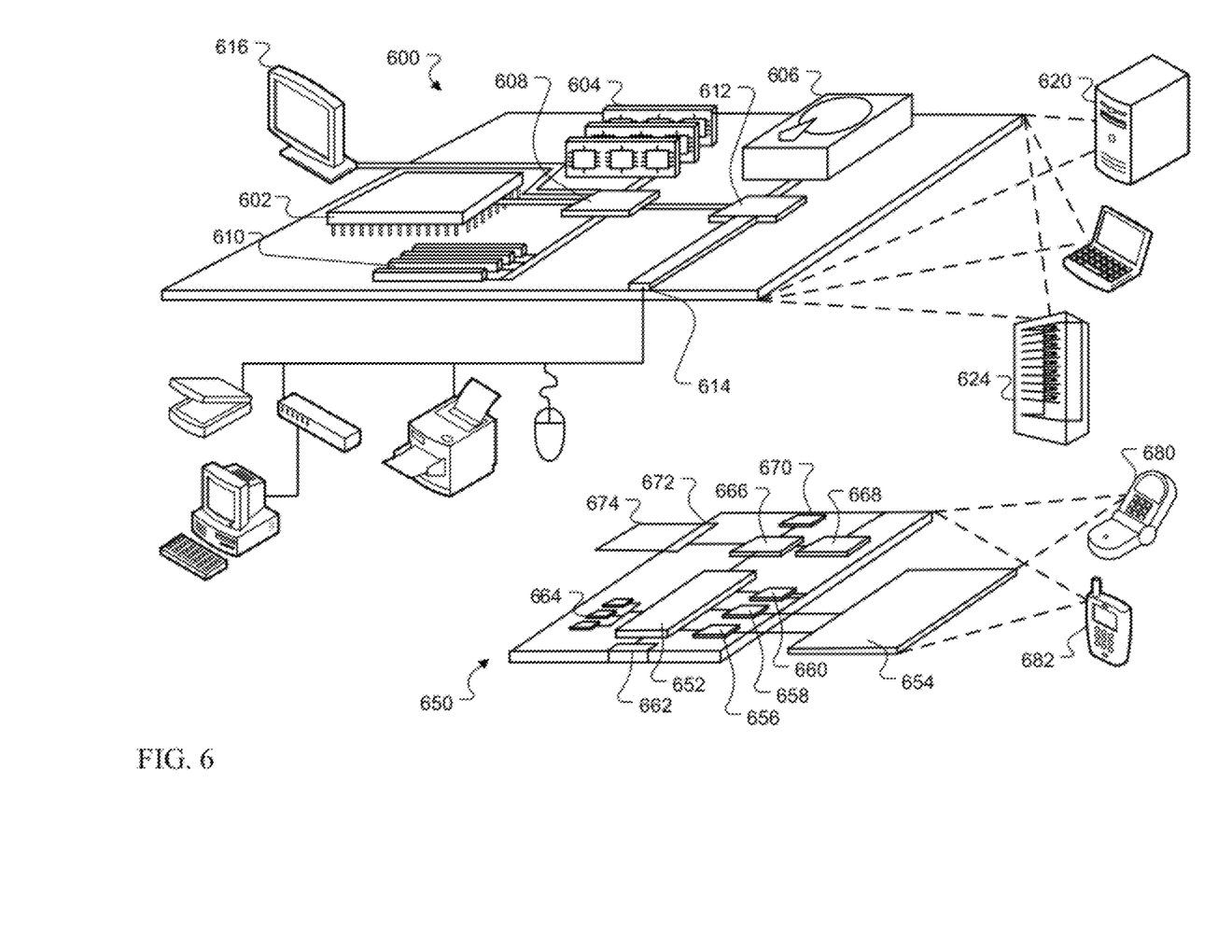
FIG. 6 is a diagram of an exemplary computing system.

FIG. 6 shows an example of a computing device 600 and a mobile computing device 650 that can be used to implement the techniques described in this disclosure. The computing device 600 is intended to represent various forms of digital computers, such as laptops, desktops, workstations, personal digital assistants, servers, blade servers, mainframes, and other appropriate computers. The mobile computing device 650 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 602), perform one or more methods, such as those described above. The instructions can also be stored by one or more storage devices such as computer- or machine-readable mediums (for example, the memory 604, the storage device 606, or memory on the processor 602).

The high-speed interface 608 manages bandwidth-intensive operations for the computing device 600, while the low-speed interface 612 manages lower bandwidth-intensive operations. Such allocation of functions is an example only. In some implementations, the high-speed interface 608 is coupled to the memory 604, the display 616 (e.g., through a graphics processor or accelerator), and to the high-speed expansion ports 610, which may accept various expansion cards (not shown). In the implementation, the low-speed interface 612 is coupled to the storage device 606 and the low-speed expansion port 614. The low-speed expansion port 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device (not shown), such as a mobile computing device 650. Each of such devices may contain one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provide as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 652), perform one or more methods, such as those described above. The instructions can also be stored by one or more storage devices, such as one or more computer- or machine-readable mediums (for example, the memory 664, the expansion memory 674, or memory on the processor 652). In some implementations, the instructions can be received in a propagated signal, for example, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 668 using a radio-frequency. In addition, short-range communication may occur, such as using a Bluetooth, WiFi, or other such transceiver (not shown). In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:

receiving, by a computing system, a request to determine a quantity of cores of one or more multi-core central processing units included in a first server that are being used by a first application executing within a first instance hosted on the first server;

obtaining, by the computing system, a first request table for the first instance that includes (i) a status indicator for each of a first plurality of requests associated with a first query plan, wherein the first query plan defines a set of operations for retrieving data from a database, and (ii) a type of request indicator associated with each of the first plurality of requests;

filtering, by the computing system, the first plurality of requests associated with the first query plan to determine first filtered requests, wherein the filtering includes determining the first filtered requests that are both: i) currently executing requests, as indicated by the status indicators, and ii) application requests that are not system requests, as indicated by the type of request indicators;

determining, by the computing system, a quantity of the first filtered requests that are associated with the first application;

determining, by the computing system, that the quantity of the first filtered requests associated with the first application is the quantity of cores used by the first application executing within the first instance on the first server; and providing, for output by the computing system, the quantity of the first filtered requests associated with the first application as the quantity of the cores used by the first application executing within the first instance on the first server.

2. The method of claim 1, further comprising processing one or more Structured Query Language (SQL) statements to generate the first query plan.

3. The method of claim 1, wherein:
a status indicator of the second subset of requests indicates the request is associated with system databases or non-application databases.

4. The method of claim 1, wherein the filtering comprises excluding requests based on business rules.

5. The method of claim 1, further comprising:
identifying, by the computing system, respective database identifications for each of the first filtered requests based on information associated with each respective first filtered request.

6. The method of claim 5, wherein identifying respective database identifications for the first filtered requests comprises identifying, by the computing system, respective database names for each of the first filtered requests based at least in part on the respective database identifications.

7. The method of claim 6, further comprising:
determining, by the computing system, that the first application is one of a plurality of applications identified as being associated with each of the first filtered requests based at least in part on the respective database names for each of the first filtered requests.

8. The method of claim 1, further comprising:
receiving, by the computing system, a request to determine a quantity of cores of one or more multi-core central processing units included in a second server that are being used by the first application executing within a second instance hosted on the second server;

obtaining, by the computing system, a second request table for the second instance that includes (i) a status indicator for each of a second plurality of requests associated with a second query plan, wherein the second query plan defines a set of operations for retrieving data from the database, and (ii) a type of request indicator associated with each of the second plurality of requests;

filtering, by the computing system, the second plurality of requests associated with the second query plan to determine second filtered requests associated with the first application, wherein the filtering excludes: a third subset of requests that are in a not-currently-executing status, as indicated by the status indicators, and a fourth subset of requests that are of a system request type, as indicated by the type of request indicators;

determining, by the computing system, a quantity of the second filtered requests that are associated with the first application;

determining, by the computing system, that the quantity of the second filtered requests is the quantity of cores used by the first application executing within the second instance on the second server; and providing, for output by the computing system, the quantity of the second filtered requests associated with the first application as the quantity of cores used by the first application executing within the second instance on the second server.

9. The method of claim 8, further comprising:
determining, by the computing system, an aggregate quantity of cores used by the first application by aggregating the quantity of cores used by the first application executing within the first instance and the quantity of cores used by the first application executing within the second instance; and outputting, by the computer system, the aggregate quantity of cores used by the first application.

10. The method of claim 9, further comprising:
providing a graphical representation of the aggregate quantity of cores used by the first application.

11. The method of claim 9, further comprising:
generating a notification if one of the quantity of cores used by the first application executing within the first instance, the quantity of cores used by the first application executing within the second instance, or the aggregate quantity of cores used by the first application exceeds a threshold value.

12. The method of claim 9, further comprising:
billing, by the computing system, a client associated with the first application based on one of the quantity of cores used by the first application executing within the first instance, the quantity of cores used by the first application executing within the second instance, or the aggregate quantity of cores used by the first application.

13. The method of claim 12, wherein billing the client further comprises multiplying the quantity of cores used by the first application executing within the first instance, the quantity of cores used by the first application executing within the second instance, or the aggregate quantity of cores used by the first application by a cost-per-core.

14. The method of claim 8, wherein:
the first server and the second server are included in a computing matrix; and
the first instance and the second instance are associated with the computing matrix.

15. The method of claim 14, wherein the first server and the second server are a single server.

16. The method of claim 1, further comprising:
providing a graphical representation of the quantity of cores used by the first application executing within the first instance.

17. A system comprising:
one or more computers; and
a computer-readable medium coupled to the one or more computers having instructions stored thereon which, when executed by the one or more computers, cause the one or more computers to perform operations comprising:
receiving, by a computing system, a request to determine a quantity of cores of one or more multi-core central processing units included in a first server that are being used by a first application executing within a first instance hosted on the first server;

obtaining, by the computing system, a first request table for the first instance that includes (i) a status indicator for each of a first plurality of requests associated with a first query plan, wherein the first query plan defines a set of operations for retrieving data from a database, and (ii) a type of request indicator associated with each of the first plurality of requests;

filtering, by the computing system, the first plurality of requests associated with the first query plan to determine first filtered requests, wherein the filtering includes determining the first filtered requests that are both: i) currently executing requests, as indicated by the status indicators, and ii) application requests that are not system requests, as indicated by the type of request indicators;

determining, by the computing system, a quantity of the first filtered requests that are associated with the first application;

determining, by the computing system, that the quantity of the first filtered requests associated with the first application is the quantity of cores used by the first application executing within the first instance on the first server; and providing, for output by the computing system, the quantity of the first filtered requests associated with the first application as the quantity of the cores used by the first application executing within the first instance on the first server.

18. The system of claim 17, further comprising:

receiving, by the computing system, a request to determine a quantity of cores of one or more multi-core central processing units included in a second server that are being used by the first application executing within a second instance hosted on the second server;

obtaining, by the computing system, a second request table for the second instance that includes (i) a status indicator for each of a second plurality of requests associated with a second query plan, wherein the second query plan defines a set of operations for retrieving data from the database, and (ii) a type of request indicator associated with each of the second plurality of requests;

filtering, by the computing system, the second plurality of requests associated with the second query plan to determine second filtered requests associated with the first application, wherein the filtering excludes: a third subset of requests that are in a not-currently-executing status, as indicated by the status indicators, and a fourth subset of requests that are of a system request type, as indicated by the type of request indicators;

determining, by the computing system, a quantity of the second filtered requests that are associated with the first application;

determining, by the computing system, that the quantity of the second filtered requests is the quantity of cores used by the first application executing within the second instance on the second server; and providing, for output by the computing system, the quantity of the second filtered requests associated with the first application as the quantity of cores used by the first application executing within the second instance on the second server.

19. A non-transitory computer storage medium encoded with a computer program, the program comprising instructions that when executed by one or more computers cause the one or more computers to perform operations comprising:

receiving, by a computing system, a request to determine a quantity of cores of one or more multi-core central processing units included in a first server that are being used by a first application executing within a first instance hosted on the first server;

obtaining, by the computing system, a first request table for the first instance that includes (i) a status indicator for each of a first plurality of requests associated with a first query plan, wherein the first query plan defines a set of operations for retrieving data from a database, and (ii) a type of request indicator associated with each of the first plurality of requests;

filtering, by the computing system, the first plurality of requests associated with the first query plan to determine first filtered requests, wherein the filtering includes determining the first filtered requests that are both: i) currently executing requests, as indicated by the status indicators, and ii) application requests that are not system requests, as indicated by the type of request indicators;

determining, by the computing system, a quantity of the first filtered requests that are associated with the first application;

determining, by the computing system, that the quantity of the first filtered requests associated with the first application is the quantity of cores used by the first application executing within the first instance on the first server; and providing, for output by the computing system, the quantity of the first filtered requests associated with the first application as the quantity of the cores used by the first application executing within the first instance on the first server.

20. The computer storage medium of claim 19, the operations further comprising:

receiving, by the computing system, a request to determine a quantity of cores of one or more multi-core central processing units included in a second server that are being used by the first application executing within a second instance hosted on the second server;

obtaining, by the computing system, a second request table for the second instance that includes (i) a status indicator for each of a second plurality of requests associated with a second query plan, wherein the second query plan defines a set of operations for retrieving data from the database, and (ii) a type of request indicator associated with each of the second plurality of requests;

filtering, by the computing system, the second plurality of requests associated with the second query plan to determine second filtered requests associated with the first application, wherein the filtering excludes: a third subset of requests that are in a not-currently-executing status, as indicated by the status indicators, and a fourth subset of requests that are of a system request type, as indicated by the type of request indicators;

determining, by the computing system, a quantity of the second filtered requests that are associated with the first application;

determining, by the computing system, that the quantity of the second filtered requests is the quantity of cores used by the first application executing within the second instance on the second server; and providing, for output by the computing system, the quantity of the second filtered requests associated with the first application as the quantity of cores used by the first application executing within the second instance on the second server.

\* \* \* \* \*

UNITED STATES PATENT AND TRADEMARK OFFICE
CERTIFICATE OF CORRECTION

PATENT NO. : 10,162,726 B2
APPLICATION NO. : 13/008178
DATED : December 25, 2018
INVENTOR(S) : Albrecht et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 509 days.

Signed and Sealed this
Tenth Day of December, 2019

Andrei Iancu
*Director of the United States Patent and Trademark Office*